(12) United States Patent
Hutchins

(10) Patent No.: US 9,801,021 B1
(45) Date of Patent: Oct. 24, 2017

(54) METHOD FOR IDENTIFYING A PORTABLE COMPUTING DEVICE WITHIN A PREDETERMINED RADIUS

(71) Applicant: Vernon Dwain Hutchins, Carencro, LA (US)

(72) Inventor: Vernon Dwain Hutchins, Carencro, LA (US)

( * ) Notice: Subject to any disclaimer, the term of this patent is extended or adjusted under 35 U.S.C. 154(b) by 0 days.

(21) Appl. No.: 15/192,367

(22) Filed: Jun. 24, 2016

(51) Int. Cl.
| | |
|---|---|
| *H04M 11/04* | (2006.01) |
| *H04W 4/02* | (2009.01) |
| *H04W 4/22* | (2009.01) |
| *H04M 1/725* | (2006.01) |
| *H04W 68/02* | (2009.01) |

(52) U.S. Cl.
CPC ....... *H04W 4/023* (2013.01); *H04M 1/72572* (2013.01); *H04W 4/22* (2013.01); *H04W 68/02* (2013.01)

(58) Field of Classification Search
CPC ..................................................... H04W 4/023
USPC ........................................... 455/456.3, 404.2
See application file for complete search history.

(56) References Cited

U.S. PATENT DOCUMENTS

2012/0231819 A1* 9/2012 Madigan ............... H04L 63/102
455/456.3

* cited by examiner

*Primary Examiner* — Charles Shedrick

(57) ABSTRACT

A method for identifying an unknown portable computing device within a specified radius is completed through a portable computing device and a plurality of communication towers that wirelessly communicate with the portable computing device. When a user of the portable computing device senses danger or an emergency, the user communicates with an arbitrary tower from the plurality of communication towers. The arbitrary tower receives a notification from the portable computing device which triggers the arbitrary tower to scan a radius of influence of the arbitrary tower. After scanning the radius of influence, the arbitrary tower saves a list of identification data for at least one unknown portable computing device. A list of location coordinates and a list of user data is saved along with the list of identification data. Therefore, the list of identification data can be later analyzed to recognize the user of the unknown portable computing device.

4 Claims, 6 Drawing Sheets

METHOD FOR IDENTIFYING A PORTABLE COMPUTING DEVICE WITHIN A PREDETERMINED RADIUS

FIELD OF THE INVENTION

The present invention relates generally to a method and system for an application. More specifically, the present invention is a method and system for a threat detection application used in the event of a burglary, motor vehicle accident, domestic restraining order, government spying, national security, burglary in progress, crowd identification, date security, and/or kidnapping.

BACKGROUND OF THE INVENTION

As seen in the recent past, a rise in burglaries and other similar crimes have seen a significant rise. Most of these crimes takes place amidst multiple witnesses. However, when the need for evidence occurs, it is proven to be extremely difficult to find the necessary evidence. As discussed below, various reasons can lead to the authorities not obtaining the relevant information as preferred.

Safety issues are one of the main reasons the general public is reluctant to participate in a crime scene investigation. As an example, when a crime occurs, the first instinct of an individual is to move away from the crime scene. Resultantly, the witnesses may not be able to gather all information from the crime scene. Therefore, the need for a convenient method which allows the witnesses to provide information instantly is clearly evident. In other words, a trusted method that can be used to collect information from the time of an incident is needed.

In addition to utilizing the present invention for providing evidence, the present invention can also be used to ensure personal safety and privacy. On most instances, when an individual is felt threatened, details regarding the person posing the threat is unknown. The present invention allows the user to help authorities to obtain information regarding the person who posed the threat.

The objective of the present invention is to address the aforementioned issues. In particular, the present invention introduces a method that can be used to identify a mobile phone or multiple mobile phones within a predetermined range. In doing so, the present invention utilizes the location of a mobile phone and information that can be obtained through the location. By utilizing the present invention, the general public can actively support the authorities in the event of emergency. Since the present invention allows the user to contact the authorities in a protective manner, safety issues that can concern the public are also eliminated by utilizing the present invention.

DETAIL DESCRIPTIONS OF THE INVENTION

All illustrations of the drawings are for the purpose of describing selected versions of the present invention and are not intended to limit the scope of the present invention.

The present invention introduces a method that can be used to identify a mobile phone or other comparable device which was present at a given location within a given time period. The intention of the present invention is to initially identify the mobile phone and then ultimately identify the owner of the mobile phone. This process of identifying the user is especially beneficial when gathering evidence for crime scene investigations and other related incidents.

Figure 1:
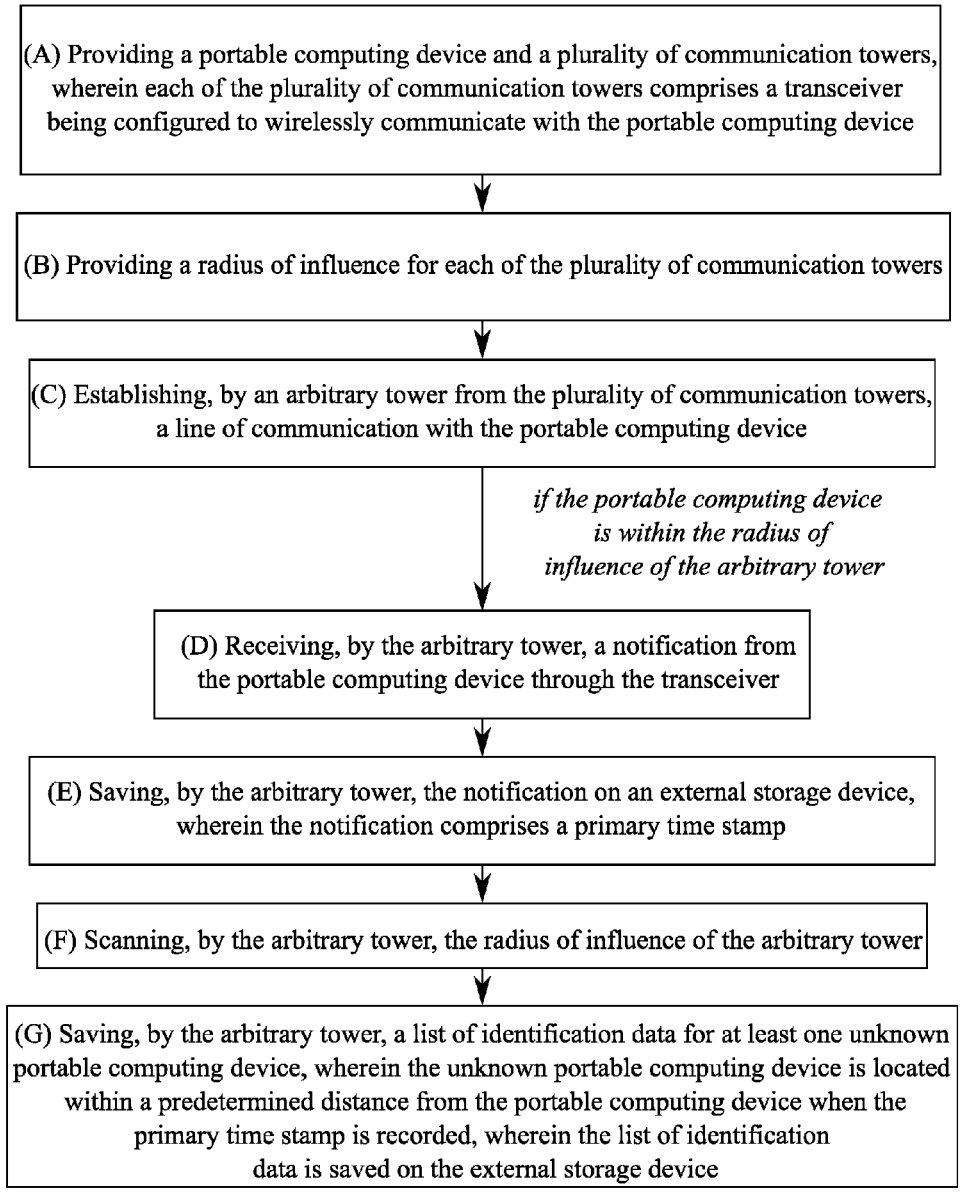
FIG. 1 is a flowchart illustrating the basic overall process of the present invention.

In order to gather the necessary information, the present invention is provided with a portable computing device and a plurality of communication towers. Each of the plurality of communication towers comprises a transceiver which is configured to wirelessly communicate with the portable computing device. In other words, the user utilizes the portable computing device to communicate with the plurality of communication towers. A radius of influence is provided for each of the plurality of communication towers which defines the operational range for each of the plurality of communication towers and can vary in different embodiments of the present invention. The portable computing device can be, but is not limited to, being a mobile phone or a tablet. As an initial step of using the present invention, the portable computing device establishes a line of communication with an arbitrary tower from the plurality of communication towers. Therefore, when the portable computing device is within the radius of influence of the arbitrary tower, the transceiver of the arbitrary tower receives a notification sent from the portable computing device. When the notification is received, the arbitrary tower saves the notification on an external storage device. The notification comprises a primary time stamp, which is saved along with the notification for future reference. Upon receiving the notification, the arbitrary tower then scans the radius of influence of the arbitrary tower in order to discover other portable computing devices within the radius of influence. Upon completing the scanning process, the present invention saves a list of identification data for at least one unknown portable computing device. As an example, if the arbitrary tower scans an area with a radius of 100 meters from the portable computing device and also within the radius of influence of the arbitrary tower, the list of identification data for the portable computing devices within that area are saved on the external storage device. The list of identification data contains information that helps initially identify the portable computing device and then identify the owner of the portable computing device. Similar to saving the notification, the list of identification data is also saved on the external storage device. The unknown portable computing device is located within a predetermined distance from the portable computing device when the primary time stamp is recorded. The basic overall process of the present invention is illustrated in FIG. 1.

Figure 6:
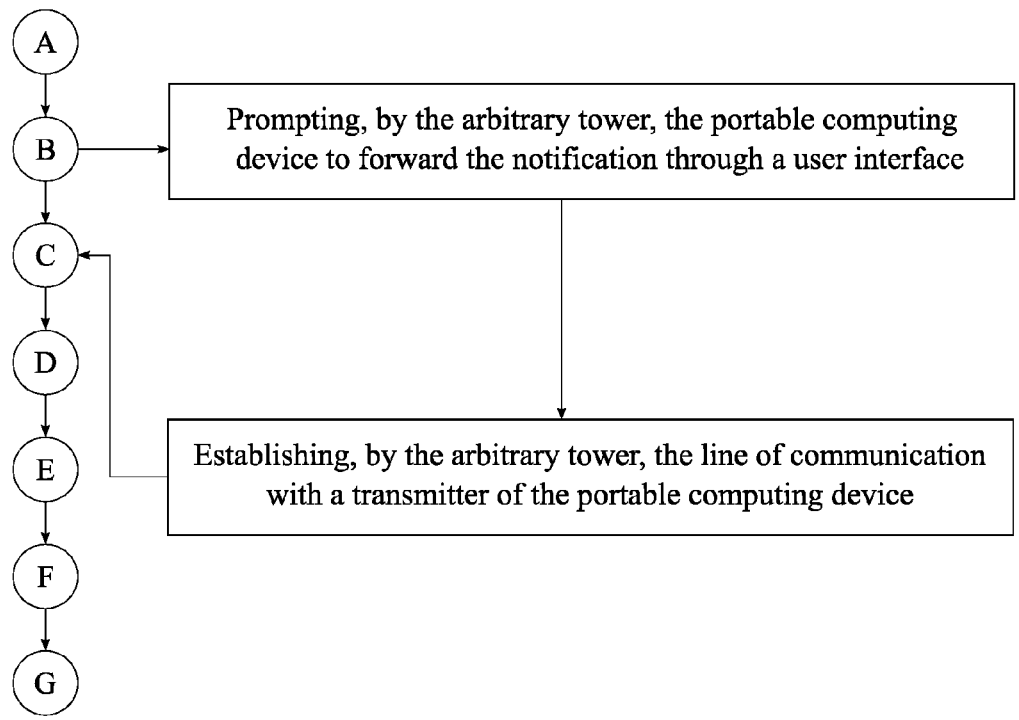
FIG. 6 is a flowchart illustrating the basic overall process of prompting the portable computing device to establish the line of communication with the arbitrary tower.

In the process of transmitting the necessary data to the arbitrary tower, the arbitrary tower initially prompts the portable computing device to forward the notification through a user interface as illustrated in FIG. 6. The user interface can be, but is not limited to, a mobile phone application or a handset. When the forwarding process is initiated, the arbitrary tower establishes the line of communication with a transmitter of the portable computing device. If a mobile phone is used, the arbitrary tower establishes the line of communication with the transmitter of the mobile phone.

Figure 2:
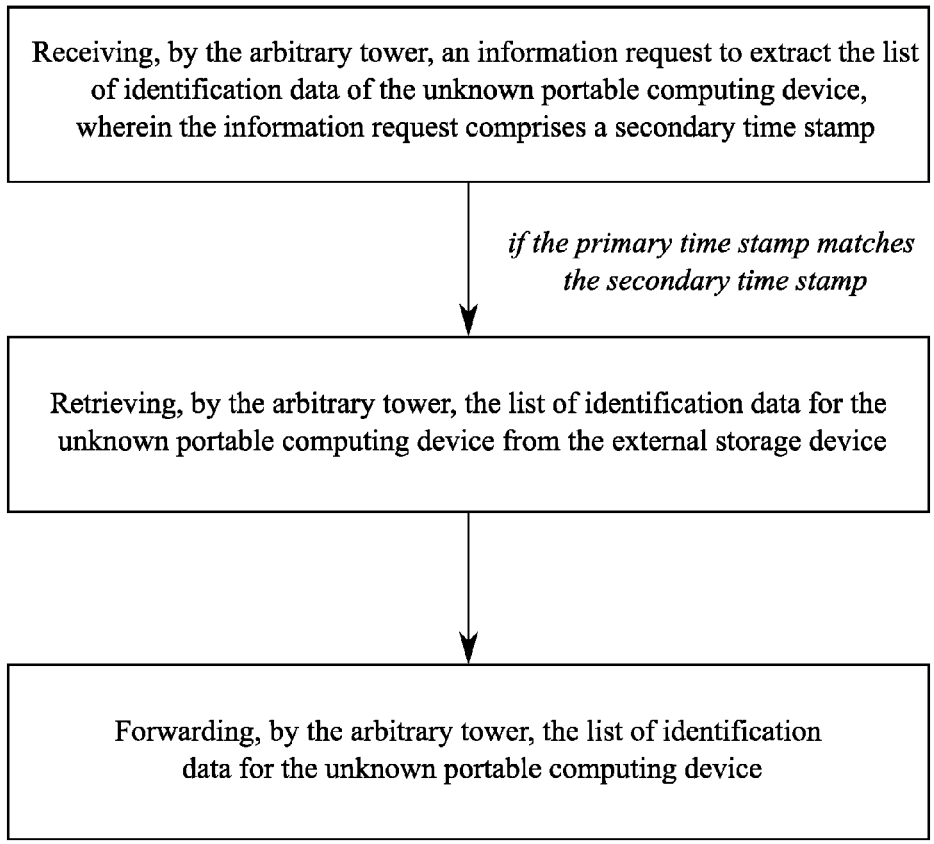
FIG. 2 is a flowchart illustrating the basic overall process of retrieving the list of identification data.

As shown in FIG. 2, when the need to retrieve the necessary information from the present invention occurs, an information request is submitted. In general, the information request contains information to retrieve the list of identification data for the at least one unknown portable computing device. In order to do so, the information request comprises a secondary time stamp which helps the arbitrary tower to filter the list of identification data according to time. When submitted, the information request is received by the arbitrary tower so that the present invention can extract the list of identification data for the unknown portable computing device. As an example, if the portable computing device is a mobile phone, information such as the mobile phone number, the international mobile station equipment identity (IMEI) of the mobile phone, and the name of the user utilizing the mobile phone are retrieved. In the process of retrieving the list of identification data, the arbitrary tower retrieves the list of identification data from the external storage device if the primary time stamp matches the secondary time stamp. Next, the arbitrary tower forwards the list of identification data for the unknown portable computing device. As an example, if some authorized personnel submits the information request, the arbitrary tower forwards the list of identification data to the authorized personnel as necessary.

Figure 3:
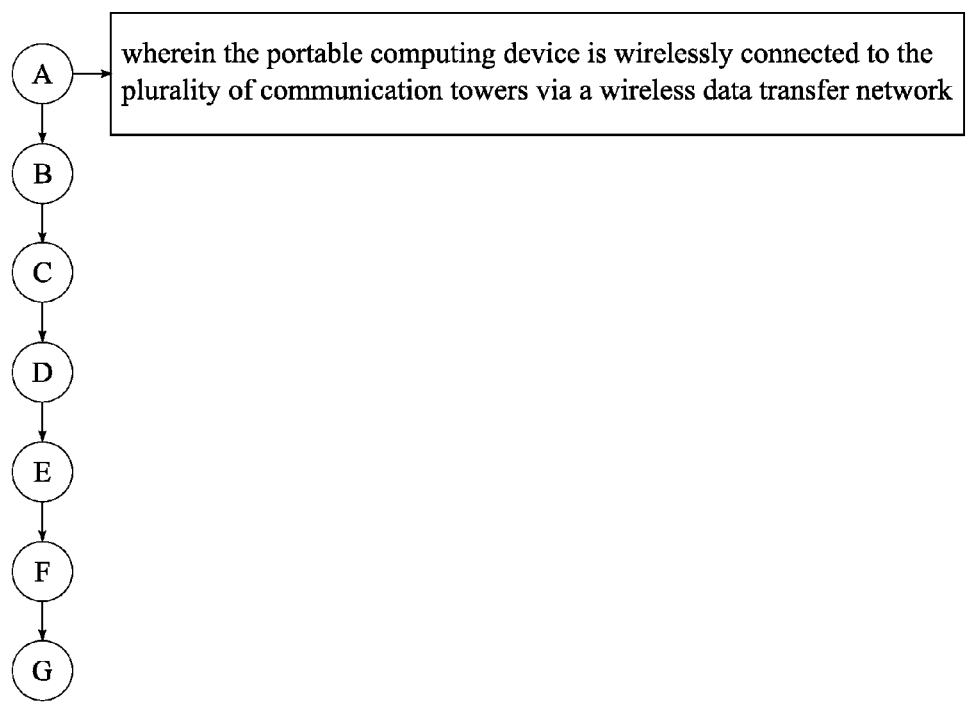
FIG. 3 is a flowchart illustrating the basic overall process of the portable computing device being connected to the plurality of communication towers via the wireless data transfer network.

In the preferred embodiment of the present invention, the portable computing device is connected to the plurality of communication towers through cellular networks. However, as illustrated in FIG. 3, in a different embodiment of the present invention, the portable computing device can be connected to the plurality of communication towers via a wireless data transfer network. In such instances, a plurality of portable computing devices is initially connected to the wireless data transfer network. Next, the wireless data transfer network connects to the plurality of communication towers.

Figure 4:
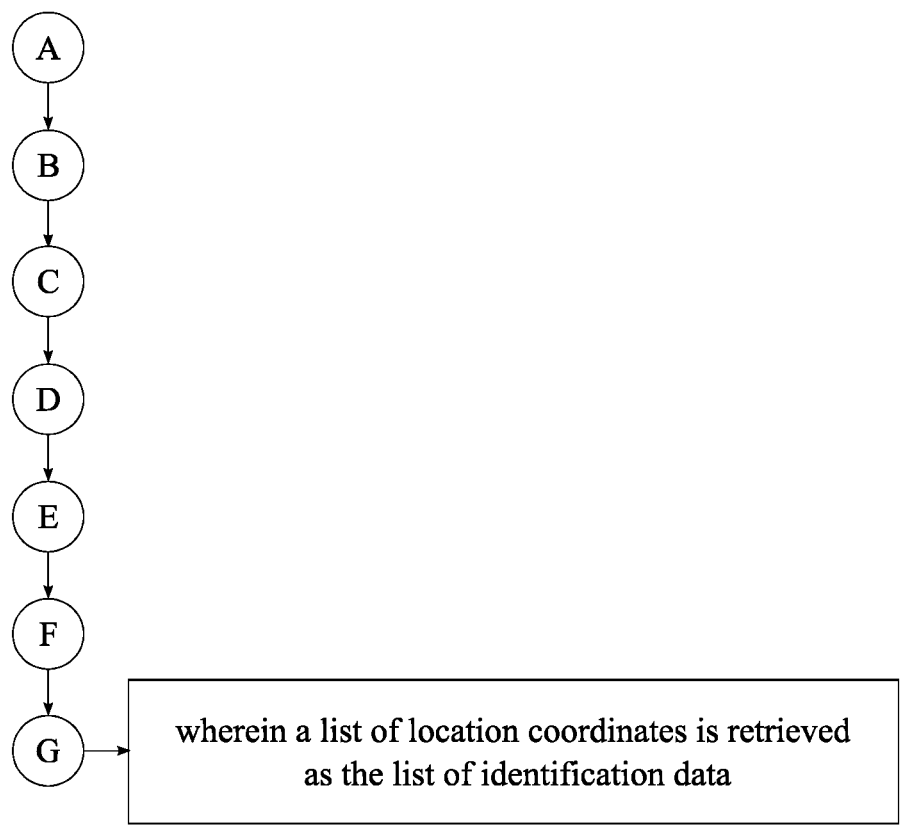
FIG. 4 is a flowchart illustrating the basic overall process of retrieving the list of location coordinates as part of the list of identification data.

As discussed earlier, the list of identification data is saved on the external storage device. When saving, a list of location coordinates is retrieved and saved on the external storage device as the list of identification data as illustrated in FIG. 4. The list of location coordinates provides the exact location of the unknown portable computing device. Therefore, the distance from the portable computing device to the unknown portable computing device can be determined with the use of the list of location coordinates.

Figure 5:
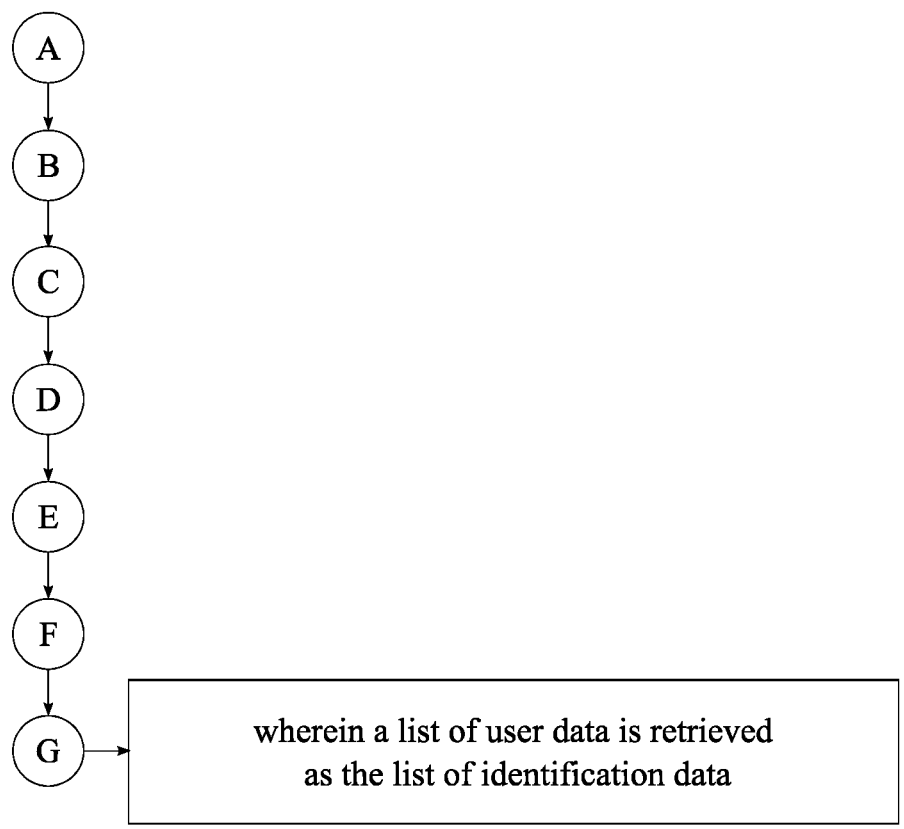
FIG. 5 is a flowchart illustrating the basic overall process of retrieving the list of user data as part of the list of identification data.

The ultimate purpose of the present invention is to identify the user of the unknown portable computing device which is in the vicinity of the portable computing device. In order to do so, a list of user data is also retrieved as the list of identification data as shown in FIG. 5. The list of user data can be, but is not limited to, name of the user and address of the user of the unknown portable computing device.

When utilizing the present invention, the following process flow is generally followed. The present invention is activated when an individual senses danger or witnesses a crime or comparable incident. In such instances, the arbitrary tower prompts the user to forward the notification through the user interface of the portable computing device. When prompted and subsequently forwarded, the arbitrary tower receives the notification through the transceiver when the portable computing device is within the radius of influence of the arbitrary tower. When the notification is received, the notification is received along with the primary time stamp. In other words, the notification is used to provide information on when an incident occurred. When the notification is saved, the arbitrary tower scans the radius of influence for other portable computing devices that are in the vicinity of the portable computing device. By doing so, the arbitrary tower saves a list of identification data for the at least one unknown portable computing device. As an example, if the user sends the notification when a burglary was witnessed 100 meters away from the location of the user, the present invention identifies the list of identification data of the unknown portable computing device which was 100 meters away from the portable computing device. By saving the list of identification data, the user of the unknown portable computing device can be identified when the need arises. When the user of the unknown portable computing device needs to be identified, the arbitrary tower receives the information request to extract the list of identification data, wherein the information request contains the secondary time stamp which filters the list of identification data. If the secondary time stamp matches the primary time stamp, the arbitrary tower retrieves the necessary list of identification data from the external storage device. When the list of identification data is retrieved, the authorities can get a better understanding of the unknown portable computing device based on the list of location coordinates and the list of user data.

Although the invention has been explained in relation to its preferred embodiment, it is to be understood that many other possible modifications and variations can be made without departing from the spirit and scope of the invention as hereinafter claimed.

What is claimed is:

1. A method for identifying an unknown portable computing device within a specified radius for threat detection purposes comprising:

providing a portable computing device and a plurality of communication towers, each of the plurality of communication towers comprising a transceiver, the transceiver being configured to wirelessly communicate with the portable computing device, the portable computing device comprising a user interface, the user interface being a mobile phone application or a handset;

providing a radius of influence for each of the plurality of communication towers;

establishing, by the portable computing device, a line of communication with an arbitrary tower from the plurality of communication towers;

receiving, by the arbitrary tower, a notification from the portable computing device through the transceiver of the arbitrary towel in response to the portable computing device being within the radius of influence of the arbitrary tower;

saving, by the arbitrary tower, the notification on an external storage device, the notification comprising a primary time stamp;

scanning, by the arbitrary tower, the radius of influence of the arbitrary tower;

saving, by the arbitrary tower, a list of identification data for at least one unknown portable computing device, the unknown portable computing device being located within a predetermined distance from the portable computing device in response to the primary time stamp being recorded, the list of identification data being saved on the external storage device;

receiving, by the arbitrary tower, an information request to extract the list of identification data of the unknown portable computing device, the information request comprising a secondary time stamp;

retrieving, by the arbitrary tower, the list of identification data for the unknown portable computing device from the external storage device in response to the primary time stamp matching the secondary time stamp;

forwarding, by the arbitrary tower, the list of identification data for the unknown portable computing device;

prompting, by the arbitrary tower, the portable computing device to forward the notification through the user interface of the portable computing device; and establishing, by the arbitrary tower, the line of communication with a transmitter of the portable computing device.

2. The method as claimed in claim 1 comprising:
the portable computing device being wirelessly connected to the plurality of communication towers via a wireless data transfer network.

3. The method as claimed in claim 1 comprising:
a list of location coordinates being retrieved as the list of identification data.

4. The method as claimed in claim 1 comprising:
a list of user data being retrieved as the list of identification data.

* * * * *